United States Patent [19]

Wang

[11] Patent Number: 5,548,685
[45] Date of Patent: Aug. 20, 1996

[54] ARTIFICIAL NEURON USING ADDER CIRCUIT AND METHOD OF USING SAME

[75] Inventor: Shay-Ping T. Wang, Long Grove, Ill.

[73] Assignee: Motorola, Inc., Schaumberg, Ill.

[21] Appl. No.: 176,604

[22] Filed: Jan. 3, 1994

[51] Int. Cl.$^6$ ............................... G06E 1/00; G06E 3/00
[52] U.S. Cl. ................... 395/24; 395/27; 395/21; 364/759
[58] Field of Search ................ 395/24, 27, 21; 364/759

[56] References Cited

U.S. PATENT DOCUMENTS

| | | | |
|---|---|---|---|
| 4,878,191 | 10/1989 | Oguchi | 364/759 |
| 5,220,559 | 6/1993 | Tsuzuki et al. | 370/60 |

OTHER PUBLICATIONS

"Digital Neural Network", T. R. Martinez, 1988 IEEE Int. Conf. on Systems, Man and Cybernetics, Aug. 8–12, pp. 681–684.

"A Digital Neural Network Architecture for VLSI", M. S. Tomlinson, et al. IJCNN, Jun. 1990, pp. 545–550.

*Primary Examiner*—Raymond J. Bayerl
*Assistant Examiner*—A. Katbab
*Attorney, Agent, or Firm*—Bruce E. Stuckman; Michael K. Lindsey; Walter W. Nielsen

[57] ABSTRACT

An artificial neuron, which may be implemented on an integrated circuit, has only one significant processing element in the form of an adder. Inputs are first fed through gating functions to produce gated inputs. These gated inputs are then added together to produce a sum which is added to a weight to produce the neuron output.

12 Claims, 3 Drawing Sheets

ARTIFICIAL NEURON USING ADDER CIRCUIT AND METHOD OF USING SAME

RELATED INVENTIONS

The present invention is related to the following inventions which are assigned to the same assignee as the present invention:

(1) "Artificial Neutron Circuit and Method of Using Same", having Ser. No. 08/076,602; now U.S. Pat. No. 5,390,136;

(2) "Neural Network and Method of Using Same", having Ser. No. 08/076,601;

(3) "Neural Network Utilizing Logarithmic Function and Method of Using Same", having Ser. No. 08/176,601, filed concurrently herewith.

TECHNICAL FIELD

This invention relates generally to artificial neurons and, in particular, to an artificial neuron that can take the form of a neuron circuit which can be employed as the building block of a neural network that can be implemented in a VLSI (very large scale integration) chip, and which artificial neuron utilizes a training algorithm that does not require repetitive training and that yields a global minimum to each given set of input vectors.

BACKGROUND OF THE INVENTION

Artificial neural networks have utility in a wide variety of computing environments, such as speech recognition, process control, optical character recognition, handwriting recognition, continuous logic or fuzzy logic, engineering and scientific computations, signal processing, and image processing. Processing engines for many of the foregoing computing environments may be implemented through neural networks comprising a plurality of elemental logic elements called neuron circuits.

A neuron circuit (or processing element) is the fundamental building block of a neural network. A neuron circuit has multiple inputs and one output. As discussed in Related Invention No. 1 above, the structure of a conventional neuron circuit often includes a multiplier circuit, a summing circuit, a circuit for performing a non-linear function (such as a binary threshold or sigmoid function), and circuitry functioning as synapses or weighted input connections. Related Invention No. 1 discloses, in one embodiment, a neuron circuit which comprises only a multiplier as its main processing element.

While the neuron circuit disclosed in Related Invention No. 1 represents a very significant advance over the previously known prior art, it would be desirable to provide an improved neuron circuit which has at least the advantages of that disclosed in Related Invention No. 1 and which is even simpler and less expensive and which requires even less silicon space when implemented on an integrated circuit.

Therefore there is a significant need for a neuron circuit as described above and which can form the basis of a neural network which does not require lengthy training cycles and which converges on a global solution in a single training cycle.

SUMMARY OF INVENTION

In one embodiment of the present invention there is provided an artificial neuron which uses only adder circuits as its main processing elements. Therefore, many more neuron circuits can be integrated in a VLSI chip, which greatly increases the computational power of a neural network using one or more of such chips.

Moreover, in contrast to conventional neural networks, a neural network constructed of a plurality of artificial neurons in accordance with the present invention as disclosed in the above-identified Related Invention No. 3, converges on a global solution in a single training cycle (also referred to as an epoch or iteration) which can often be computed in no more than a few minutes on a personal computer.

Thus it will be appreciated that a neural network comprising artificial neurons in accordance with the present invention performs with vastly more accurate results, at a vastly improved reduction in computational time, and with a vast reduction in the cost and complexity of its implementation, particularly on a semiconductor chip.

Thus it is one advantage of the present invention to provide a neuron circuit which comprises a minimum of circuit elements so that a neural network may be built comprising a very large number of such neuron circuits, resulting in a product which is commercially competitive due to its high level of functionality and low cost of manufacture.

It is also an advantage of the present invention to provide an artificial neuron which comprises only an adder as its main processing element.

Yet another advantage of the present invention is to provide an artificial neuron which can be utilized as the building block of a neural network (disclosed in the above-identified Related Invention No. 3) which does not require repetitive training and which yields a global minimum to each given set of input vectors.

It is another advantage of the present invention to provide various methods of using an artificial neuron in accordance with the present invention.

According to one aspect of the invention, there is provided a neuron circuit comprising an adder circuit responsive to a plurality of gated inputs and generating an output, the adder circuit comprising means for adding the gated inputs together to produce a sum, and means for adding the sum to a predetermined weight to generate the output.

According to another aspect of the invention, there is provided in a neuron having a plurality of inputs $x_i$, wherein i is a positive integer, a method of producing an output comprising (a) applying a gating function ($g_i$) to each of the inputs $x_i$ to produce a corresponding plurality of gated inputs; (b) adding the gated inputs together to produce a sum; and (c) adding the sum to a predetermined weight W.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It will be understood by one of ordinary skill in the art that the terms "neuron circuit" and "neuron" are used interchangeably in this description, as are the terms "multiplier circuit" or "multiplier", and the terms "adder", "summing circuit", or "summer", depending upon the type of implementation.

Figure 1:
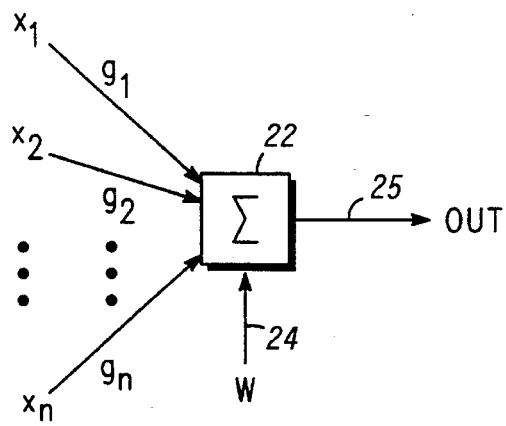
FIG. 1 shows a conceptual block diagram of an artificial neuron in accordance with a preferred embodiment of the invention.

With reference now to FIG. 1, a conceptual block diagram of an artificial neuron in accordance with a preferred embodiment of the invention is shown. Inputs $x_1, x_2, \ldots, x_n$ are gated by respective gating functions $g_1, g_2, \ldots, g_n$ to produce gated inputs that are multiples of $g_1, g_2, \ldots, g_n$. For example, if $g_i=0$, then the gated input corresponding to input $x_i$ is $0 * x_i$ or simply 0; if $g_i=1$, then the gated input corresponding to input $x_i$ is $x_i$, if $g_i=2$, then the gated input corresponding to input $x_i$ is $2 * x_i$, and so forth.

The gated inputs $g_1 * x_1, g_2 * x_2 \cdots g_n * x_n$ are summed together in adder 22, and their summation is added to a weight W being input over line 24. The resulting summation is the output (OUT) from adder 22 over line 25.

As is explained in further detail in the above-identified Related Invention No. 3, the appropriate values of $g_i$ and W are determined by the individual terms of a polynomial expansion or orthogonal function which is utilized as the basis of operation of a neural network incorporating a plurality of the herein-described artificial neurons.

Figure 2:
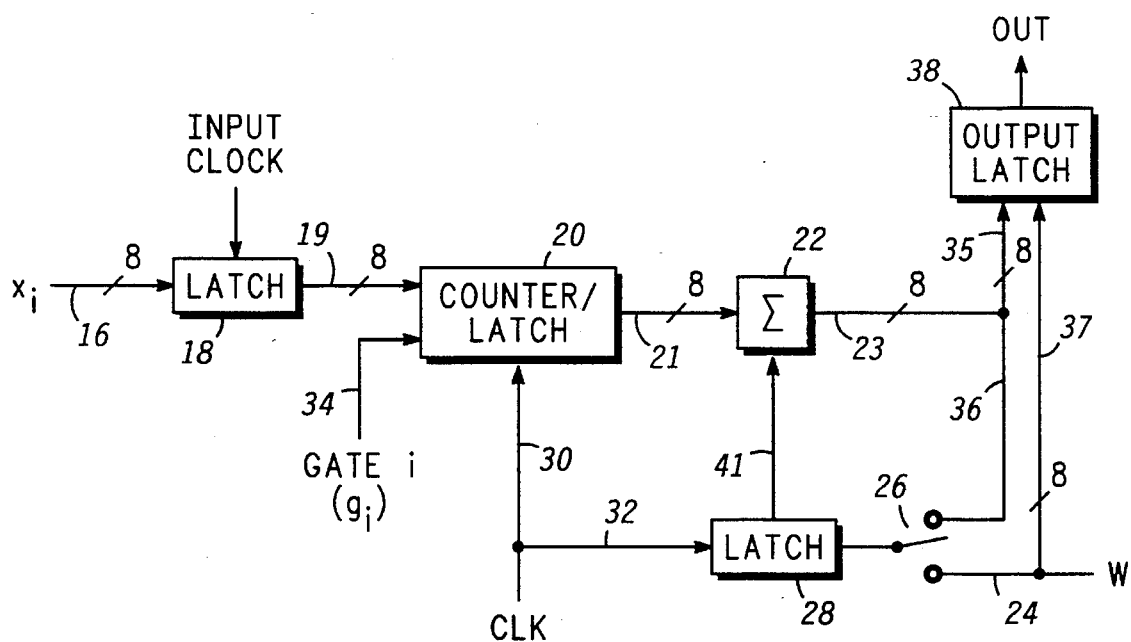
FIG. 2 shows a logic circuit implementation of a neuron circuit employing an adder circuit in accordance with a preferred embodiment of the invention.

It will be understood by one of ordinary skill in the art that the artificial neuron shown in FIG. 1 may be implemented in many different ways, one of which is shown in FIG. 2.

FIG. 2 is a logic circuit implementation of the neuron circuit of the present invention which is conceptually shown in FIG. 1. In this embodiment, a plurality of inputs $x_i$ are sequentially applied to the neuron circuit.

The neuron circuit comprises five primary elements: counter/latch 20, adder 22, multiplexer (MUX) 26, latch 28, and output latch 38. An input latch 18 is also shown as part of this circuit implementation; however, in a neural network comprising a plurality of neuron circuits, as disclosed, for example, in the above-identified Related Invention No. 3, a single input latch 18 may be shared by a plurality of neuron circuits. Adder 22 represents the only significant processing element of the neuron circuit.

Although FIG. 2 shows data busses 16, 19, 21, 23, 24, 35, 36, 37, and 41 as being eight bits in width, it will be understood by one of ordinary skill in the art that the widths of data busses may be 16 bits or any other desired value.

Input latch 18 receives inputs $x_i$ over data bus 16. Input latch 18 is controlled by an INPUT CLOCK which is generated when the count in counter/latch 20 reaches 0. It will be understood by one of ordinary skill that a neural network comprises many neuron circuits, each of which may comprise a counter/latch circuit, and that the INPUT CLOCK will not be generated until the count in all of such counter/latches reaches 0.

The output of input latch 18 is fed to counter/latch 20 via, for example, an 8-bit data bus 19.

Counter/latch 20 and latch 28 are responsive to an internal clock signal (CLK). CLK increments at a constant rate. Counter/latch 20 and latch 28 receive CLK via lines 30 and 32, respectively.

Counter/latch 20 serves to hold the input data for a desired number of CLK cycles in order to produce the desired gating function. Counter/latch 20 is responsive to a gating input line 34 over which are provided values $g_i$ for the corresponding input values $x_i$.

As explained above regarding FIG. 1, inputs $x_1, x_2, \ldots, x_n$ are gated by respective gating functions $g_1, g_2, \ldots, g_n$ to produce gated inputs $g_i * x_i$. For example, if $g_i=2$, then the gated input corresponding to input $x_i$ is $2 * x_i$.

The output of counter/latch 20 is provided to adder 22 via an 8-bit data bus 21. The output of latch 28 is provided to adder 22 via an 8-bit data bus 41. The output of adder 22 is coupled to the input of latch 28 via 8-bit data bus segments 23 and 36 and via multiplexer 26. Multiplexer 26 multiplexes the output values of adder 22, received over bus segment 36, and weight W, received over bus 24, to the input of latch 28.

The output of adder 22 is also coupled to the input of output latch 38 via 8-bit data bus segment 35. Weight W is also coupled to an input of output latch 38 via an 8-bit bus segment 37. For certain calculations it will be understood that W can be sent to output latch 38 directly, bypassing the adder 22.

At the start of a computational cycle MUX 26 is switched to data bus 24 to receive weight W. After adder circuit 22 generates the first summation, MUX 26 switches to couple line 36 to latch 28.

Latch 28 temporarily holds the output of adder 22 for addition with the output of counter/latch 20.

Counter/latch 20 functions as a count-down circuit, in that it is initially loaded with the value of $g_i$ and counts down to $g_i=0$. As will be explained in greater detail below, for each internal clock cycle the value of $g_i$ which has been applied to counter/latch 20 over line 34, and is being stored therein, is reduced by one, and so long as $g_i$ is not equal to 0, the input value $x_i$ is continued to be added by the summation of the previous addition cycle, which is applied over bus segments 23 and 36, through MUX 26, to latch 28. When $g_i=0$, adder 22 stops adding, and the output of adder 22, appearing at the output latch 38, represents the output (OUT) of the neuron circuit.

The neuron circuit of the embodiment shown in FIG. 2 thus generates an output of the form $W+g_1x_1+g_2x_2+g_3x_3+g_4x_4+\ldots g_nx_n$.

Figure 3:
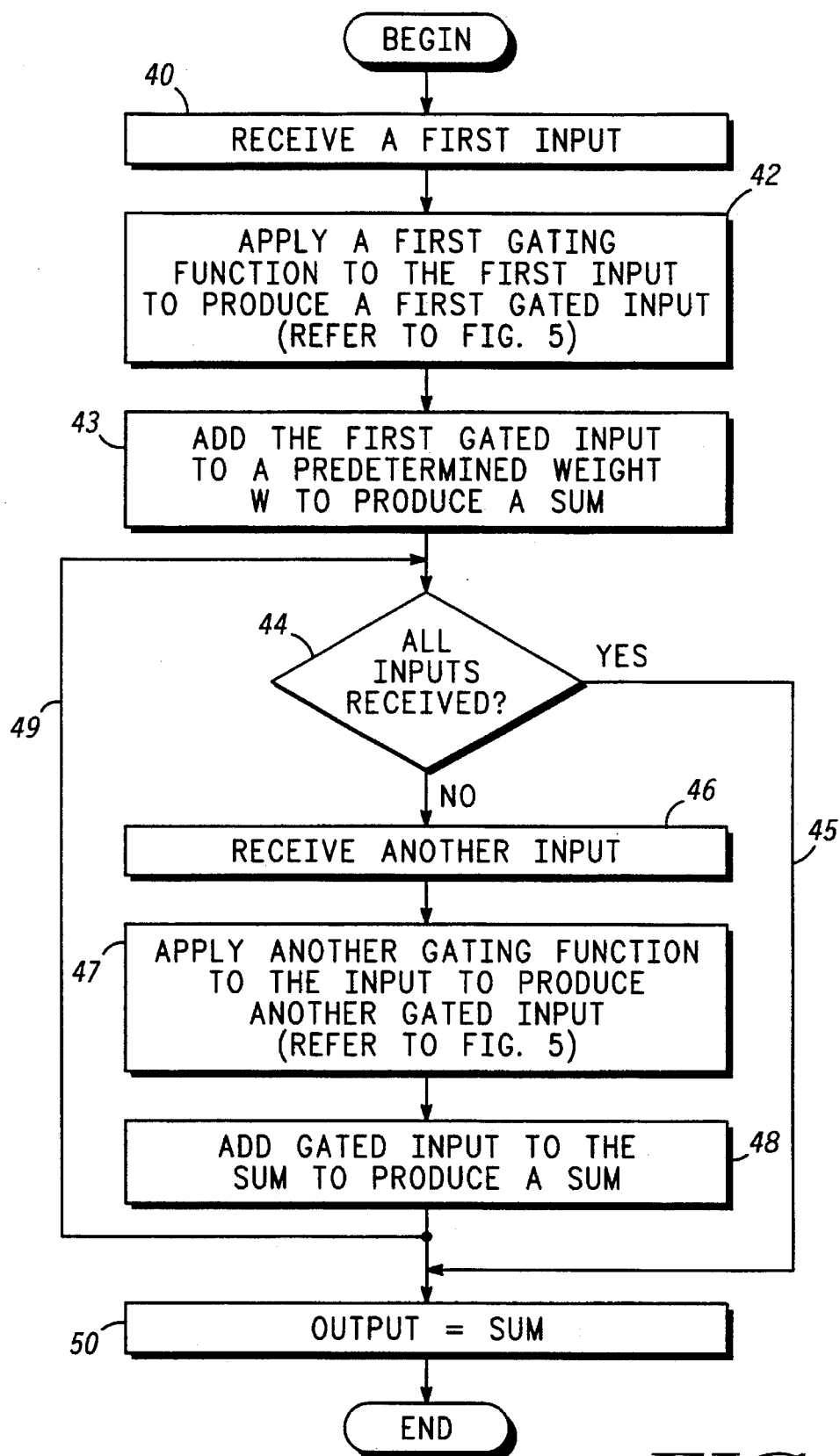
FIG. 3 shows a flow diagram of a method of using a neuron circuit in accordance with a preferred embodiment of the invention.

FIG. 3 shows a flow diagram of a method of using a neuron circuit in accordance with a preferred embodiment of the invention. The method whose steps are illustrated in FIG. 3 relates to the neuron circuit shown in FIG. 2.

As illustrated in box 40, a first input is received by the neuron circuit, e.g. by latch 18 (FIG. 2).

Next, as illustrated in box 42, a first gating function is applied to the first input to produce a first gated input. The gating function is shown in greater detail in FIG. 5, discussed below.

Next, as illustrated in box 43, the first gated input is added to a predetermined weight W to produce a sum.

Next, regarding decision box 44, a check is made to determine whether all inputs have yet been received. If so, the procedure is finished with the current batch of inputs, and it exits via line 45. If not, the procedure proceeds to box 46.

As illustrated in box 46, another input is received by the neuron circuit.

Next, regarding box 47, another gating function is applied to this input to produce another gated input.

Then, in box 48, the gated input produced in box 47 is added to the sum produced in box 43 (or previously produced in box 48, if this is not the first time through box 48) to produce a sum.

The procedure then returns to decision box 44 via line 49.

After the procedure has dealt with all inputs, and it exits decision box 44 via line 45 into box 50, where the final sum represents the output of the neuron circuit.

Figure 4:
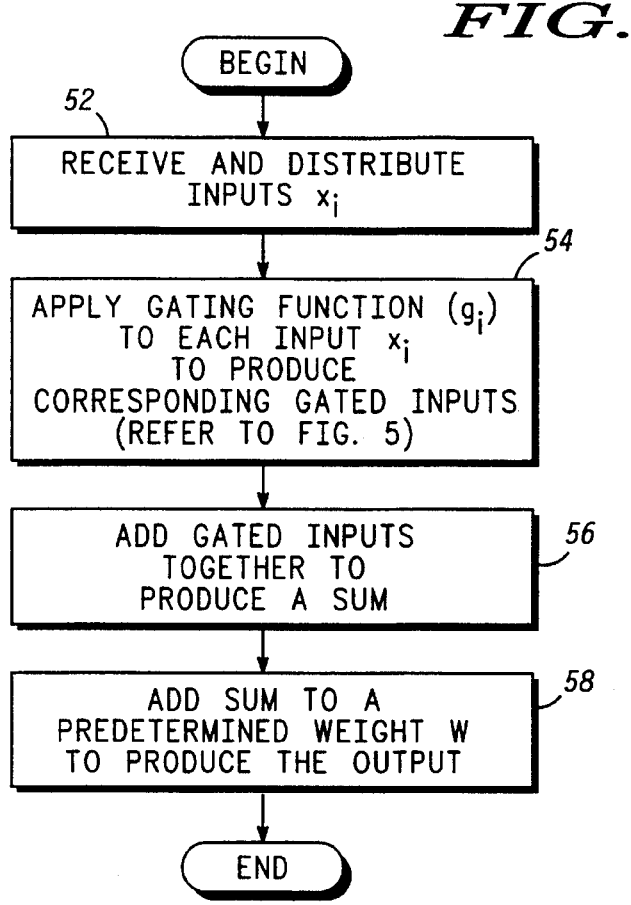
FIG. 4 shows a flow diagram of an alternative method of using a neuron circuit in accordance with the present invention.

FIG. 4 shows a flow diagram of an alternative method of using a neuron circuit in accordance with the present invention. The method whose steps are illustrated in FIG. 4 relates to the artificial neuron shown in FIG. 1.

As illustrated in box 52, a plurality of inputs $x_i$ are received by the artificial neuron and distributed to the adder circuit.

As illustrated in box 54, as the plurality of inputs $x_i$ are distributed to the adder, a gating function is applied to each of them to produce a corresponding plurality of gated inputs. The gating function is shown in greater detail in FIG. 5, discussed below.

As illustrated in box 56, the gated inputs are added together to produce a sum. Then, as illustrated in box 58, the sum is added to a predetermined weight W to produce a sum representing the output of the artificial neuron.

Figure 5:
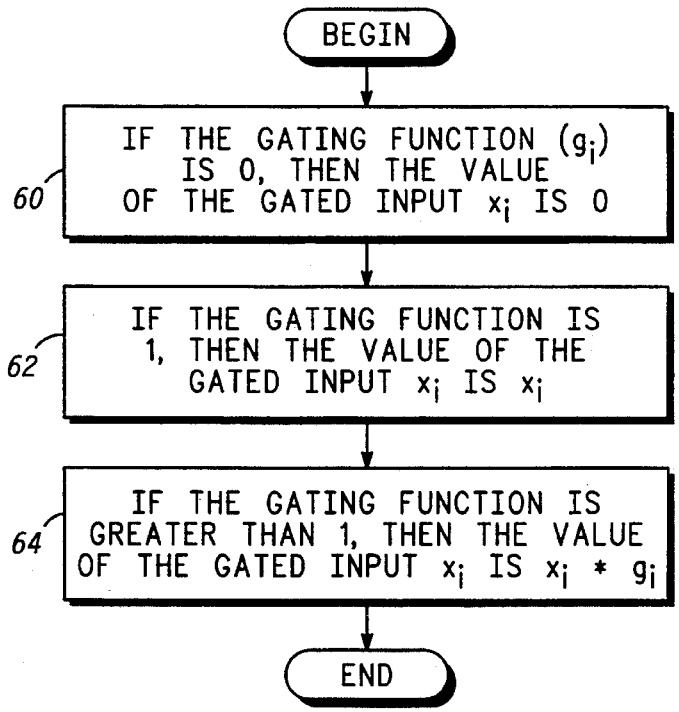
FIG. 5 shows a flow diagram of a gating function which may form part of the methods of using a neuron circuit illustrated in FIGS. 3 and 4.

FIG. 5 shows a flow diagram of a gating function which may form part of the methods of using a neuron circuit illustrated in FIGS. 3 and 4.

With reference to FIGS. 1 and 5, the gating function applicable to the inputs $x_i$ of the neuron circuit may be expressed by the following: (a) if the gating function $g_i$ is 0, pass 0 to the adder circuit 22 (refer to box 60 of FIG. 5); (b) if the gating function $g_i$ is 1, pass the input $x_i$ to the adder circuit 22 (refer to box 62); and if the gating function is greater than 1, pass the input $x_i$ multiplied by $g_i$ to the adder circuit 22 (refer to box 64).

The neuron circuit of the embodiment shown in FIG. 1 thus generates an output of the form $W+g_1x_1+g_2 x_2+\ldots g_nx_n$.

Operation of a Preferred Embodiment

With reference now to FIG. 2, the operation of a preferred embodiment of the invention will be described. In the example given below, the objective is to generate a neuron circuit output of $6+3x_1+2x_2$ for any value of input variables $x_1$ and $x_2$.

This will be explained with reference to Table I below.

Initially counter/latch 20 is loaded with the value $g_1=3$. Because the $g_i$ count is not equal to 0, the value $x_1$ will pass to the adder 22 (in accordance with the gating function described above regarding FIG. 8) to be added with W=6 on line 24 through MUX 26.

Then counter/latch 20 begins counting down, and, so long as the $g_i$ count is not equal to 0, $x_1$ will continually be added to the summation from the adder 22. When the $g_i$ count reaches 0, then adder 22 will cease addition (or will simply continue adding by 0, depending upon the implementation of a neural network incorporating the neuron circuit) and wait for the next input $x_2$. At this point the intermediate output of the neuron circuit is $6+3x_1$.

When INPUT CLOCK=2, and $x_2$ is latched into latch 18, and $g_2=2$ is loaded into counter/latch 20, the operation continues essentially as described above until counter/latch 20 counts down to 0. At this point the final output of the neuron circuit is $6+3x_130 2x_2$.

The detailed operation is described by Table I below.

TABLE I

| INPUT CLOCK SEQUENCE | CLK SEQUENCE | COUNTER/ LATCH | OUTPUT |
| --- | --- | --- | --- |
| 1 | 1 | 3 | $6 + x_1$ |
| 1 | 2 | 2 | $6 + 2x_1$ |
| 1 | 3 | 1 | $6 + 3x_1$ |
| 1 | 4 | 0 | $6 + 3x_1$ |
| 2 | 5 | 2 | $6 + 3x_1 + x_2$ |
| 2 | 6 | 1 | $6 + 3x_1 + 2x_2$ |
| 2 | 7 | 0 | $6 + 3x_1 + 2x_2$ |
| 2 | 8 | — | $6 + 3x_1 + 2x_2$ |

TABLE I

While in this example the weight of the neuron circuit was added at the beginning of the computational cycle, it will be understood that it may be added at any appropriate time.

Summary

Thus there has been described herein a concept, as well as several embodiments including a preferred embodiment, of an artificial neuron, and a method of producing an artificial neuron output, which require only an adder as their primary processing element.

Therefore, more neurons can be integrated in a VLSI chip or in a computer program, thereby greatly increasing the computational power of a neural network employing a plurality of such neurons.

This results in a neural network product having significant commercial advantages over those of the prior art in terms of processing power and speed, cost of manufacture, versatility of application, and market acceptance.

In the above-identified Related Invention No. 3 there are disclosed various embodiments of neural networks which use the herein-disclosed artificial neuron as a basic building block. This is because of the unique functions of such artificial neuron, namely the ability to add together a plurality of gated inputs and to add the resulting summation to a weight value. Because of these properties, the various embodiments of neural networks which are disclosed in the above-identified Related Invention No. 3 may use the herein-disclosed artificial neuron to great advantage in implementing the polynomial expansions or orthogonal functions which form the basis of operation of such neural networks.

Therefore, there has been described herein an artificial neuron that can form the basis of a neural network which does not require lengthy training cycles and which converges on a global solution in a single training cycle.

Furthermore, it will be apparent to those skilled in the art that the disclosed invention may be modified in numerous ways and may assume many embodiments other than the preferred form specifically set out and described above.

Moreover, implementations may be made in which the plurality of inputs $x_i$ may be processed in parallel rather than sequentially by appropriate circuitry.

In addition, the output latch may be replaced by a multiplexer.

Accordingly, it is intended by the appended claims to cover all modifications of the invention which fall within the true spirit and scope of the invention.

What is claimed is:

1. A neuron comprising:

an adder circuit responsive to a plurality of gated inputs and generating an output, said adder circuit including:

means for adding said gated inputs together to produce a sum; and means for adding said sum to a predetermined weight to generate said output; and a latch/counter for generating said gated inputs from a plurality of inputs to said neuron, said latch/counter means transmitting a given input $x_i$ to said adder circuit during $g_i$ addition cycles of said adder circuit, wherein $g_i$ represents a non-negative integer, said given input $x_i$ being added during each of said $g_i$ addition cycles resulting in a gated input having a form $g_i * x_i$.

2. The neuron of claim 1, wherein said latch/counter means receives a sequence of neuron inputs and generates a corresponding sequence of gated inputs.

3. The neuron of claim 1, wherein said neuron is included in an integrated circuit.

4. A neuron circuit comprising:

first latch means responsive to a plurality of inputs $x_i$ for sequentially storing each of said inputs $x_i$ and for sequentially providing each of said stored inputs $x_i$ as an output thereof, wherein i is a positive integer;

counter/latch means responsive to the output of said first latch means and providing said stored inputs as an output thereof;

second latch means for providing an output;

an adder circuit having a first input responsive to the output of said counter/latch means and a second input responsive to the output of said second latch means, and generating a sum;

a multiplexer for coupling either said sum or a weight value W to an input of said second latch means;

wherein said counter/latch means is further responsive to a plurality of values $g_i$, there being a value $g_i$ corresponding to each value $x_i$, said counter/latch means storing a given input $x_i$ for $g_i$ addition cycles of said adder circuit, said input $x_i$ being added to said sum during each of said addition cycles, said sum being added to said weight value during one of said addition cycles, and said neuron circuit generating a neuron output which includes said sum having a form $$W + \sum_{i=m}^{n} g_i x_i,$$

wherein m and n represent integers.

5. The neuron circuit recited in claim 4, and further comprising an output latch having a first input responsive to said sum and a second input responsive to said weight value W so that said weight value W can bypass said adder circuit, said output latch generating said neuron output.

6. The neuron circuit recited in claim 4, wherein said first latch means is responsive to an input clock signal.

7. The neuron circuit recited in claim 6, wherein said input clock signal is generated when the value of $g_i$ in said counter/latch is zero.

8. The neuron circuit recited in claim 5, wherein said counter/latch means is responsive to an internal clock signal.

9. The neuron circuit recited in claim 5, wherein said second latch means is responsive to an internal clock signal (CLK).

10. The neuron circuit recited in claim 4, wherein each of said inputs $x_i$ comprises a plurality of bits.

11. In a neuron circuit having a plurality of inputs, a method of producing an output comprising the following steps:

(a) receiving a first input $x_i$ of said plurality of inputs;

(b) generating a first gated input using a latch/counter, the latch/counter transmitting said first input $x_i$ to an adder circuit during $g_i$ addition cycles of said adder circuit, wherein $g_i$ represents a non-negative integer corresponding to said first input $x_i$, said first input $x_i$ being added during each of said $g_i$ addition cycles resulting in said first gated input having a form $g_i * x_i$;

(c) adding a predetermined weight to said first gated input to produce a sum;

(d) determining whether all of said plurality of inputs have been received;

(i) if so, assigning said sum as the output of said neuron circuit;

(ii) if not, proceeding to step (e);

(e) receiving another of said plurality of inputs;

(f) generating a gated input by transmitting said input $x_{i+1}$ to an adder circuit during $g_{i+1}$ addition cycles of said adder circuit, wherein $g_{i+1}$ represents a non-negative integer corresponding to said input $x_{i+1}$, said input $x_{i+1}$ being added during each of said $g_{i+1}$ addition cycles resulting in said gated input having a form $g_{i+1} * x_{i+1}$;

(g) adding said gated input to said sum to produce a further sum; and (h) returning to step (d) until all of said plurality of inputs have been received.

12. In a neuron having a plurality of inputs, a method of producing an output comprising the following steps:

(a) generating a plurality of gated inputs from said plurality of inputs, each of said gated inputs being generated by transmitting a given input $x_i$ to an adder circuit during $g_i$ addition cycles of said adder circuit, wherein $g_i$ represents a non-negative integer, said given input $x_i$ being added during each of said $g_i$ addition cycles resulting in a gated input having a form $g_i * x_i$;

(b) adding said gated inputs together to produce a sum;

(c) adding said sum to a predetermined weight W;

(d) assigning said sum as the output of said neuron.

* * * * *

UNITED STATES PATENT AND TRADEMARK OFFICE
CERTIFICATE OF CORRECTION

PATENT NO. : 5,548,685
DATED : August 20, 1996
INVENTOR(S) : Shay-Ping T. Wang

It is certified that error appears in the above-indentified patent and that said Letters Patent is hereby corrected as shown below:

Col. 8, line 6, "claim 5" should read --claim 4--.

Col. 8, line 8, "claim 5" should read --claim 4--.

Col. 8, line 40, "$g_{i+}*x_{i+1}$" should read --$g_{i+1}*x_{i+1}$--.

Signed and Sealed this

Twenty-sixth Day of August, 1997

Attest:

BRUCE LEHMAN

Attesting Officer

Commissioner of Patents and Trademarks